Figure 1:
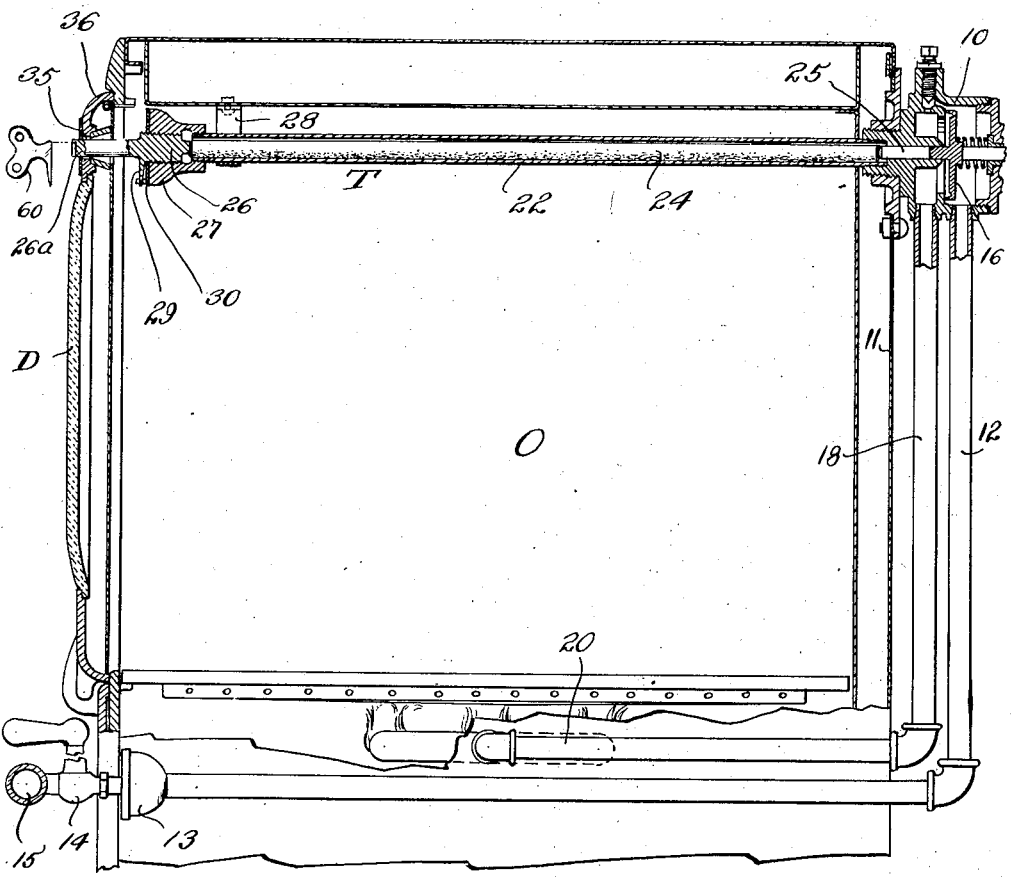

March 30, 1926.

A. H. TINNERMAN

THERMOSTATIC CONTROL FOR STOVE OVENS

Filed May 9, 1924

INVENTOR
Albert H. Tinnerman
By Bates, Macklin, Goldrick & Teare
ATTORNEYS

March 30, 1926. 1,578,939
A. H. TINNERMAN
THERMOSTATIC CONTROL FOR STOVE OVENS
Filed May 9, 1924 2 Sheets-Sheet 2

INVENTOR
Albert H. Tinnerman
BY Bates, Macklin, Goldrick & Teare
ATTORNEYS

Patented Mar. 30, 1926.

1,578,939

UNITED STATES PATENT OFFICE.

ALBERT H. TINNERMAN, OF CLEVELAND, OHIO.

THERMOSTATIC CONTROL FOR STOVE OVENS.

Application filed May 9, 1924. Serial No. 711,955.

*To all whom it may concern:*

Be it known that I, ALBERT H. TINNERMAN, a citizen of the United States, residing at Cleveland, in the county of Cuyahoga and State of Ohio, have invented a certain new and useful Improvement in a Thermostatic Control for Stove Ovens, of which the following is a full, clear, and exact description, reference being had to the accompanying drawings.

This invention is concerned with cook stoves and is directed to the installation of thermostatic controls for regulating the temperature of the stove oven.

The general object of my invention is directed to the provision of a novel arrangement for installing a thermostatic control on a gas range oven whereby the thermostat may be disposed entirely within the oven and may be regulated exteriorly of the oven.

There are two types of thermostatic control installations which have met with the approval of stove manufacturers, namely, the type which has the regulating means disposed exteriorly of the oven and from which extends the thermocouple passing through a wall of the oven and into the interior thereof. The second type comprises a thermostatic control mechanism which is disposed completely within the oven with the regulating means positioned adjacent the door opening of the oven. The former type is objectionable for the reason that the exposed parts of the thermostat accumulate dirt and generally detract from the effect of the symmetrical appearance of the stove structure, while the latter type is objectionable for the reason that once the oven is heated and it is desired to reset the thermostat to a different temperature control, the lack of illumination and partial inaccessibility makes it very inconvenient to adjust the thermostat. The latter type has the advantage, however, in that it is completely enclosed within the stove oven.

More specifically therefore, the object of my invention is to provide a thermostatic control installation which may be completely inclosed within the stove oven, preferably in an upper corner thereof and which may have means extending through or associated with the door or oven walls whereby the thermostat may be set to a desired temperature control without necessitating reaching into the oven.

Other objects of my invention will hereinafter be set forth in the following description referring to the accompanying drawings illustrating a preferred form thereof. The essential characteristics are summarized in the claims.

Figures 6, 7:
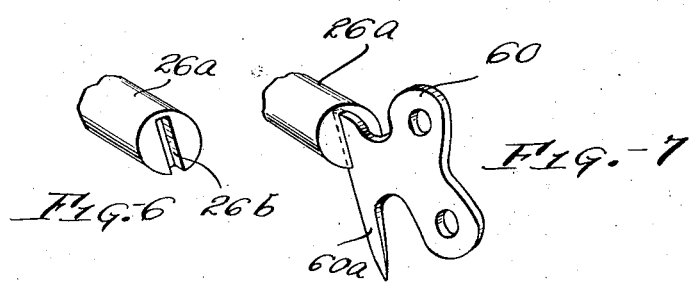
Figure 2:
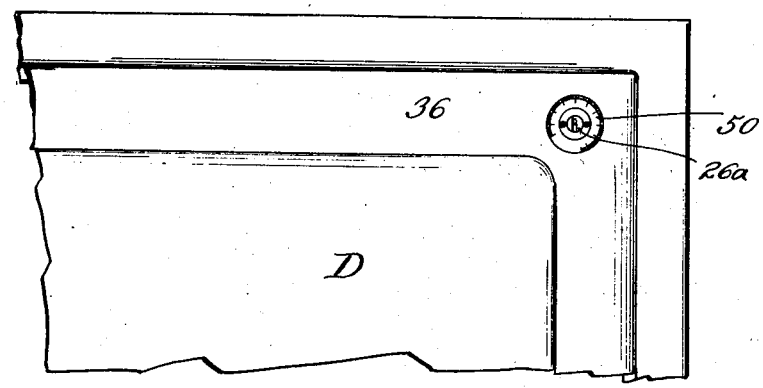
Figure 4:
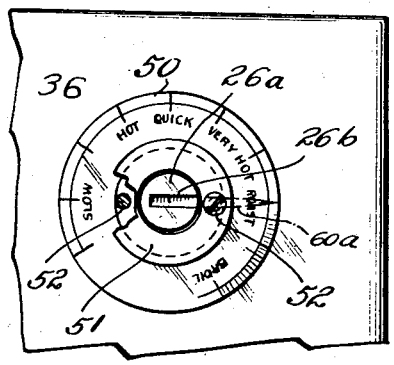
Figure 3:
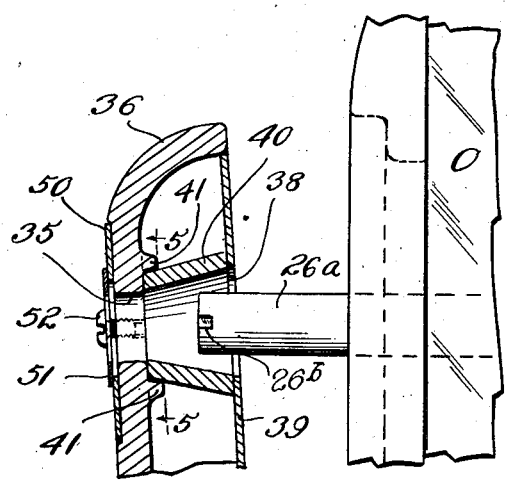
Figure 5:
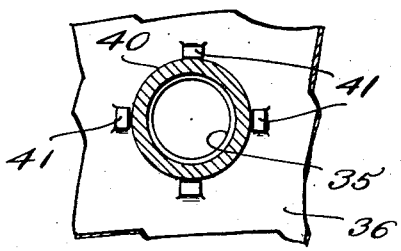

In the drawings, Fig. 1 is a cross-sectional elevation of a stove oven showing a preferred form of my novel thermostatic control installation; Fig. 2 is a fragmentary front elevation of the door and oven of the stove; Fig. 3 is an enlarged fragmentary cross-sectional view of a portion of the door associated with the thermostatic control; Fig. 4 is an enlarged front elevational view of one corner of the door frame provided with a thermostatic dial; Fig. 5 is a cross-sectional detail taken substantially along the line 5—5 of Fig. 3; Figs. 6 and 7 are perspective views of the end of a control member for the thermostat.

In Fig. 1, I show a stove comprising an oven O having a thermostatic control device T installed in the upper right hand corner thereof. This thermostatic device may comprise a valve head 10 secured to the rear wall 11 of the stove oven structure. A pipe line 12 may extend from a mixer 13 associated with a gas line 14 extending rearwardly from the feed line 15 at the front of the stove. The line 12 extends into the valve body 10 on one side of a spring pressed diaphragm 16 which comprises a thermostatic valve, opening and closing communication between the line 12 and a burner line 18 extending from the valve body 10 on the opposite side of the diaphragm 16 to the oven burner 20 disposed beneath the bottom panel of the oven. In the present thermostatic device, the operation of the diaphragm 16 is controlled by the expansion of a copper tube 22 which may encase a carbon rod or a rod formed of other non-expansible material 24. The rear end of the rod 24 abuts a pin 25 extending from the diaphragm 16 while the front end abuts an adjustable screw member 26 in threaded engagement with a dial head 27 secured to the front end of the copper tube 22. Supporting means in the form of a bracket 28 may be provided to support the front end of the thermostatic device. The member 26 may be provided with a pointer 29 which may be swung around the face of a dial 30 secured to the member 27.

The practice heretofore in the use of this particuar type of thermostat has been to provide a key which would fit a square head formed on the member 26 immediately adjacent the pointer 29.

To overcome the objections to this particular type of thermostatic installation as hereinbefore set forth, I provide means extending from the thermostat through an opening formed in the oven door D whereby the member 26 may be adjusted without opening the oven door and I provide a duplicate valve or dial on the door frame which may be set to conform with the markings on the inner dial 30.

In the present instance, I provide an opening 35 in the door frame 36 which aligns with the member 26 and I also provide an extension $26^a$ upon the member 26 which will project through the opening 35 when the door is completely closed, the opening of course being of slightly greater diameter than the diameter of the extension $26^a$. To permit a free swinging of the door frame, a larger opening 38 is provided in the door lining 39. A conic sleeve 40 may be inserted between the lining and the inner face of the door frame 36 to support the lining about the periphery of the opening 38 as well as to prevent the undue passage of heat through the inner opening in the lining 39 between the door frame and the lining and also to prevent foreign matter accumulating between the lining and door. The sleeve 40 may be maintained in place in any suitable manner, for example, by lugs 41 formed on the door frame which engage the outer or smaller end of the conic sleeve 40 and prevent displacement thereof. The lining when secured in place of course serves to maintain the sleeve in engagement with the lugs.

An adjustable dial 50 is mounted upon the outer face of the door frame 36 with a central aperture thereof aligning with the opening 35 formed in the door frame. This dial may have markings corresponding to the markings of the inner dial 30 and may be set to conform therewith. The dial 50 may be maintained in place by a washer 51 held by screws 52 so spaced that the dial 50 may bear thereon and thereby be maintained in proper relation to the aperture in the door frame as shown in Fig. 4. When the dial is once positioned to have the markings thereof conform to the position of the corresponding markings on the inner dial 30, the screws 52 may be tightened and the outer dial is thus permanently set.

The outer end of the extension $26^a$ of the adjusting member 26 may be provided with a slot $26^b$ in alignment with the inner pointer 29, slot $26^b$ being open on one side whereby a key 60 may be inserted in the slot and the member 26 set to the desired control position without any possibility of confusion and to which way the pointer $60^a$ on the key 60 should be positioned.

It will be seen that the foregoing arrangement only necessitates the provision of an auxiliary dial surrounding an opening formed in the door of the oven and an extension on the usual thermostat passing through this opening, the form of the extension and of the opening being such that the door may be swung freely without interfering with the responsive action of the thermostat to the heat of the oven.

It is to be understood that the dial may be positioned on the oven frame and not on the door and the extension passed through an opening formed in the frame of the stove or any other members comprising the frame of the stove.

I claim:

1. In a stove the combination of an oven structure including a door, a thermostatic control device enclosed by the oven and mounted independently of the door, a dial mounted upon the door and means extending from the thermostatic control device to the dial whereby the thermostat may be set without opening the door.

2. In combination a stove having a baking oven and a door therefor, a thermostatic control device responsive to the heat of the oven and mounted in the latter independently of the door and means extending through an opening in the door and associated with the thermostatic control device for setting the thermostat.

3. In combination a stove having a baking oven and a door therefor, a thermostatic control device responsive to the heat of the oven for controlling the temperature thereof, said device being suspended in the oven independently of the door, and means extending between the door and the thermostatic control device for setting the thermostat exteriorly of the oven.

4. In a stove the combination of an oven structure including a door, a thermostatic couple enclosed by the oven and mounted therein independently of the door, a gas valve operated by expansion and contraction of the thermostatic couple, and means extending from the thermostatic couple through the door whereby the thermostat may be set without opening the door.

5. In a gas range of the character described, the combination of an oven structure including a door, a horizontally disposed thermostatic couple positioned in the upper region of the oven and completely enclosed thereby, said thermostatic couple being mounted in the oven independently of the door, a dial mounted upon the door of the oven and an adjustable member associated with the dial and extending between the thermostatic couple and the door for setting the thermostatic couple without opening the door.

6. In a gas range of the character described, the combination of an oven structure including a door, a thermostatically responsive device positioned in the upper region of the oven independently of the door and completely enclosed by the oven and an extension member protruding from said device through the door whereby it may be adusted without opening the door.

7. In a gas range of the character described, an oven structure, a door therefor, a thermostatic device controlling a valve in a burner line, said device being immovable relative to the door and mounted within the oven independently of the door, and means extending between the door and the thermostatic control device for setting the device without opening the door.

8. In a gas range the combination of a gas line disposed along the front of the range, a gas line extending from said front gas line to the rear of the range, a thermostatically controlled valve, a burner connected to the line, the valve being disposed between the burner and the front gas line, an oven door, a thermostatic couple mounted within the oven of the range independently of the oven door, an extension member between the door and the thermostatic couple, a dial on the door and means for setting the extension member to a definite position relative to the dial without necesitating an opening of the door.

9. In a gas range the combination of an oven structure, including an oven door, a burner for said oven, a main gas line, a thermostatically controlled valve disposed between the burner and main gas line, a thermostatic couple completely enclosed by the oven and fixed therein and terminating adjacent the oven door, said thermostatic couple serving to control the valve and means extending through an opening in the door for setting the thermostatic couple.

10. In a gas range the combination of an oven structure, a burner therefor, a main gas line, a thermostatically controlled valve disposed between the burner and main gas line, a thermostatic couple completely mounted within the oven and terminating adjacent the oven door, said couple controlling the valve and means extending through an opening in the door of the oven for setting the thermostatic couple.

11. In a gas range the combination of an oven structure, a main gas line, a burner for the oven, a line connecting the main gas line to the burner, a thermostatically controlled valve disposed in the last named line between the gas line and the burner, a thermostatic couple for automatically operating said valve and an adustable member for adjusting one of the members comprising the thermostatic couple, an oven door movable relative to said adjustable member, a dial surrounding an opening in the door, said adjustable member extending through said opening and means for setting said adjusting member relative to the dial on the door.

12. In a gas range the combination of a main gas line, an oven structure, a burner for the oven, a gas line between the main gas line and the burner, a thermostatically controlled valve controlling the last named line, a thermostatic couple comprising two members having different coefficients of expansion, one of the members serving to operate said valve and means for adjusting one of said members whereby one member will move the other upon expansion or contraction thereof, said means being immovable relative to the door when the door is swung and extending through an opening in the oven door whereby the relative movement between the two members may be adjusted exteriorly of the oven.

13. In a gas range the combination of a main gas line, an oven structure, a burner for the oven, a gas line between the main gas line and the burner, a thermostatically controlled valve controlling the last named line, a thermostatic couple fixed within the oven and serving to operate said valve and means for adjusting the couple for regulating the reaction therof upon the valve, said means extending through an opening in the oven door but permitting the door to swing freely, while the thermostatic couple remains fixed within the oven.

14. In a gas range the combination of an oven structure, including a door, a burner therefor, a main gas line, a thermostatically controlled valve disposed between the burner and main gas line, a thermostatic couple completely enclosed by the oven and terminating adjacent the oven door, a dial on the couple, a second dial on the door, and means extending between the dials for setting the dials in unison, while adjusting the thermostatic couple.

In testimony whereof, I hereunto affix my signature.

ALBERT H. TINNERMAN.